(12) United States Patent
Xu

(10) Patent No.: US 11,803,995 B2
(45) Date of Patent: Oct. 31, 2023

(54) TARGET TRACKING METHOD AND APPARATUS, TERMINAL DEVICE, AND STORAGE MEDIUM

(71) Applicant: SHENZHEN INSTITUTE OF INFORMATION TECHNOLOGY, Guangdong (CN)

(72) Inventor: Shouxiang Xu, Guangdong (CN)

(73) Assignee: SHENZHEN INSTITUTE OF INFORMATION TECHNOLOGY, Guangdong (CN)

( * ) Notice: Subject to any disclaimer, the term of this patent is extended or adjusted under 35 U.S.C. 154(b) by 0 days.

(21) Appl. No.: 17/311,854

(22) PCT Filed: Jul. 31, 2020

(86) PCT No.: PCT/CN2020/106225
§ 371 (c)(1),
(2) Date: Jun. 8, 2021

(87) PCT Pub. No.: WO2022/021336
PCT Pub. Date: Feb. 3, 2022

(65) Prior Publication Data
US 2023/0154086 A1 May 18, 2023

(51) Int. Cl.
*G06T 13/40* (2011.01)
(52) U.S. Cl.
CPC .................................. *G06T 13/40* (2013.01)
(58) Field of Classification Search
None
See application file for complete search history.

(56) References Cited

U.S. PATENT DOCUMENTS 10,656,278 B1 * 5/2020 Souto Maior ........... H04W 4/02
2017/0337813 A1 * 11/2017 Taylor .................. G05D 1/0285
(Continued)

FOREIGN PATENT DOCUMENTS

CN     110975291 A     4/2020
CN     111095170 A     5/2020
(Continued)

OTHER PUBLICATIONS

Xu Ren-feng et al., Design and Implementation of the Autonomous Chase Behavior Model for Active Perceptual Virtual Humans, Journal of Chinese Computer Systems, vol. 35 No. 4, 2014.

*Primary Examiner* — Hilina K Demeter
(74) *Attorney, Agent, or Firm* — BROOKS KUSHMAN PC; John E. Nemazi

(57) ABSTRACT

This application discloses a target tracking method and apparatus, a terminal device, and a storage medium. The target tracking method includes: determining a path node nearest to the virtual character as a travelling node according to a starting position of the virtual character; moving toward the travelling node until arriving at the travelling node; determining a current next path node to be reached by the virtual character according to the path node where the virtual character is currently located, the path node currently nearest to a target being tracked and a pre-stored path routing matrix, here the path routing matrix is a matrix storing an optimal next path node from a first path node to a second path node; moving to the next path node to approach the target being tracked. Embodiments of this application can improve the target tracking efficiency of the virtual character in the VR scene.

20 Claims, 2 Drawing Sheets

(56) References Cited

U.S. PATENT DOCUMENTS

2019/0012832 A1     1/2019   Sun et al.
2020/0294311 A1*   9/2020   Holz .................... H04N 13/271

FOREIGN PATENT DOCUMENTS

CN        111279394 A    6/2020
CN        111375205 A    7/2020

* cited by examiner

TARGET TRACKING METHOD AND APPARATUS, TERMINAL DEVICE, AND STORAGE MEDIUM

CROSS REFERENCE TO RELATED APPLICATIONS

The present application is a National Stage of PCT Application No. PCT/CN2020/106225 filed on Jul. 31, 2020, the content of which is incorporated herein in its entity.

TECHNICAL FIELD

The present application relates to the field of VR (Virtual Reality) technologies, and particularly to a target tracking method, a target tracking apparatus, a terminal device, and a storage medium.

BACKGROUND

Existing VR scenes usually consist of virtual characters and virtual environments. The virtual character refers to a three-dimensional model generated by the VR technologies through simulation and provided with a human appearance, an animal appearance, or an imaginary appearance (such as a flying dragon) designed by humans, which can simulate perception and behaviors of the humans or animals.

Target tracking is an existing typical task performed by the virtual character in the VR scene. In the existing VR scenes, the virtual environment may change over time, or may change due to influence of an action of the virtual character on the virtual environment and influence of other dynamic factors, that is, the virtual environment in the VR scene is an uncertain and dynamically changing environment. When the virtual character tracks a target in the VR scene, it is often necessary to combine the real-time dynamic changes of the virtual environment to make complex action decisions. Therefore, the existing processes for the virtual character performing the target tracking task are complex and are provided with a large amount of calculation, which leads to a low efficiency in the target tracking.

Technical Problem

Given this, the present application provides a target tracking method, a target tracking apparatus, a terminal device, and a storage medium, so as to solve the problem in the art how to improve the efficiency of the virtual character tracking a target in the VR scenes.

SUMMARY

A first aspect of the present application provides a target tracking method which is applied to a virtual character, and the method includes steps of:
 determining a path node nearest to the virtual character as a travelling node according to a starting position of the virtual character, here the path node is a node on a preset semantics path in a VR scene, the semantics path is a trajectory drawn on geometry of a virtual environment and composed of nodes and directed connections among the nodes, and node information comprises at least node position information and node environment information;
 moving toward the travelling node until arriving at the travelling node;
 determining a current next path node to be reached by the virtual character according to the path node where the virtual character is currently located, the path node currently nearest to a target being tracked and a pre-stored path routing matrix, here the path routing matrix is a matrix storing an optimal next path node from a first path node to a second path node, the first path node and the second path node are arbitrary two of the path nodes, the optimal next path node is the path node nearest to the first path node in an optimal path from the first path node to the second path node, and the optimal path is a path with the highest travel efficiency;
 moving to the next path node to approach the target being tracked.

A second aspect of the present application provides a target tracking apparatus, which includes:
 a travelling node determination unit configured to determine a path node nearest to a virtual character as a travelling node according to a starting position of the virtual character, here the path node is a node on a preset semantics path in a VR scene, the semantics path is a trajectory drawn on geometry of a virtual environment and composed of nodes and directed connections among the nodes, and the node information comprises at least node position information and node environment information;
 a travel unit configured to move toward the travelling node until the travelling node is arrived at;
 a path routing unit configured to determine a current next path node to be reached by the virtual character according to the path node where the virtual character is currently located, the path node currently nearest to a target being tracked and a pre-stored path routing matrix, here the path routing matrix is a matrix storing an optimal next path node from a first path node to a second path node, the first path node and the second path node are arbitrary two of the path nodes, the optimal next path node is the path node nearest to the first path node in an optimal path from the first path node to the second path node, and the optimal path is a path with the highest travel efficiency;
 a movement unit configured to move to the next path node to approach the target being tracked.

A third aspect of the present application provides a terminal device, which includes a memory, a processor, and a computer program stored in the memory and executable on the processor. The processor, when executing the computer program, implements the steps of the above target tracking method.

A fourth aspect of the present application provides a computer-readable storage medium with a computer program stored thereon, the computer program, when executed by a processor, implements the steps of the above target tracking method.

A fifth aspect of the present application provides a computer program product, the computer program product, when executed on a terminal device, causes the terminal device to implement the steps of the above target tracking method.

Beneficial Effects

In the embodiments of the present application, because the semantics path that can record the position information and the environment information (that is, the node position information and the node environment semantics information) is drawn on the virtual environment of the VR scene in advance, and the path routing matrix contained in the VR scene is stored, then when the virtual character is tracking the target, the virtual character only needs to go to a travelling node according to its own position to enter the semantics path, and directly and quickly determines the current next path node according to the path node where the current virtual character is located, the path node currently nearest to the target being tracked and the pre-stored path routing matrix. That is, the virtual character can immediately make an action decision of the target tracking according to the pre-constructed semantics path and the path routing matrix during the target tracking process, without performing path planning and complex action decisions in real time according to real-time change information of the virtual environment, therefore, the complexity of the target tracking performed by the virtual character can be reduced, and the amount of calculation can be reduced, thereby improving the target tracking efficiency of the virtual character. Moreover, since the optimal next path node stored in the path routing matrix is the path node on an optimal path when the virtual character goes to arbitrary one second path node from arbitrary one first path node in the VR environment, and the optimal path is the path with the highest travel efficiency, therefore, the next path node and movement determined according to the path routing matrix can make the virtual character approach the target being tracked efficiently, thereby further improving the target tracking efficiency of the virtual character.

DESCRIPTION OF THE DRAWINGS

In order to more clearly describe the technical solutions in the embodiments of the present application, the drawings needed to be used in the description for the embodiments or the prior art will be briefly introduced below. Obviously, the drawings in the following description are only some embodiments of the present application, and other drawings may be obtained based on these drawings for those of ordinary skill in the art without paying any creative effort.

IMPLEMENTATIONS OF THIS APPLICATION

Figure 1:
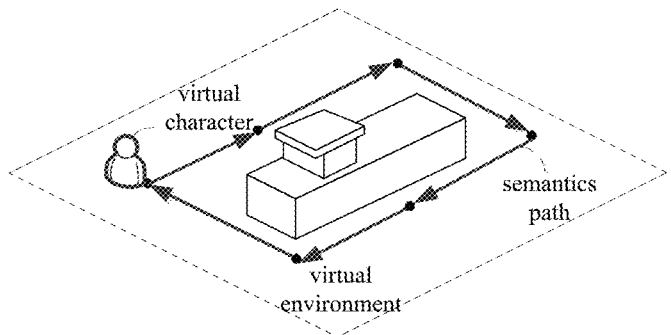
FIG. 1 is a schematic diagram of a VR scene provided by the present application.

In the following description, for the purpose of illustration rather than limitation, specific details such as a specific system structure and technology are proposed for a thorough understanding of the embodiments of the present application. However, it should be understood by those skilled in the art that the present application can also be implemented in other embodiments without these specific details. In other cases, detailed descriptions for well-known systems, apparatus, circuits, and methods are omitted to avoid unnecessary details from obstructing the description for the present application.

In order to illustrate the technical solutions of the present application, specific embodiments are used for illustration below.

It should be understood that, when used in this specification and appended claims, the term "comprising" indicates existence of a described feature, whole, step, operation, element and/or component, but does not exclude existence or addition of one or more other features, wholes, steps, operations, elements, components and/or collections thereof.

It should also be understood that the terms used in the specification of the present application are only for the purpose of describing specific embodiments and are not intended to limit the present application. As used in the specification and the appended claims of the present application, the singular forms "a", "an" and "the" are intended to include plural forms, unless other cases are clearly indicated otherwise.

It should be further understood that the term "and/or" used in the specification and appended claims of the present application refers to any combination and all possible combinations of one or more of items listed in association, and includes these combinations.

In addition, in the description of the present application, the terms "first", "second", etc. are only used to distinguish the description, and cannot be understood as indication or implication of relative importance.

The existing VR scenes usually consist of virtual characters and virtual environments, and the virtual character acts in the virtual environment to complete a preset task. The target tracking is a typical task, i.e., the task that the virtual character tracks a specified target and this target may be a specified object located in the virtual environment or a specified another virtual character. Since the virtual environment in the VR scene is an uncertain and dynamically changing environment, then when the virtual character tracks a target in the VR scene, it is often necessary to combine the real-time dynamic changes of the virtual environment to make complex action decisions, thereby resulting in that the existing processes for the virtual character performing the target tracking task are complex and are provided with a large amount of calculation, which in turn leads to a low efficiency in the target tracking. In order to solve this problem, the embodiments of the present application provide a target tracking method, a target tracking apparatus, a terminal device, and a storage medium. Because a semantics path that can record position information and environment information (that is, node position information and node environment semantics information) is drawn on the virtual environment of the VR scene in advance, and a routing matrix containing the path in the VR scene is stored, then when the virtual character is tracking the target, the virtual character only needs to go to a travelling node according to its own position to enter the semantics path, and directly and quickly determines the current next path node according to the path node where the current virtual character is located, the path node currently nearest to the target being tracked and the pre-stored path routing matrix. That is, the virtual character can immediately make an action decision of the target tracking according to the pre-constructed semantics path and path routing matrix during the target tracking process, without performing path planning and complex action decisions in real time according to real-time change information of the virtual environment, therefore, the complexity of the target tracking performed by the virtual character can be reduced, and the amount of calculation can be reduced, thereby improving the target tracking efficiency of the virtual character. Moreover, since the optimal next path node stored in the path routing matrix is a path node on an optimal path when the virtual character goes to arbitrary one second path node from arbitrary one first path node in the VR environment, and the optimal path is a path with the highest travel efficiency, therefore, the next path node and movement determined according to the path routing matrix can make the virtual character approach the target being tracked efficiently, thereby further improving the target tracking efficiency of the virtual character.

As shown in FIG. 1, an application scene of an embodiment of the present application is specifically a VR scene, which is composed of a virtual character, a virtual environment, and a semantics path. There may be a plurality of semantics paths in the VR scene, and the semantics path is a medium for the virtual character to interact with the virtual environment.

Specifically, the semantics path is a trajectory drawn on geometry of the virtual environment and composed of nodes and directed connections among the nodes, and node information includes at least node position information and node environment node information. Specifically, the directional connections constitute information about a direction and a distance for each of the nodes to be able to set out and be entered into; the node position information records coordinate node information on the virtual environment; the node environment information records state information of positions of the virtual environment where the nodes are located in real time, which may be represented by a corresponding state identification number, for example, environmentState=29 is used to indicate that a door near this node is closed. Moreover, the node information further includes node behavior semantics information, which is used to identify a behavior that needs to be completed correspondingly when the virtual character moves to this node, and may be represented by a corresponding behavior identification number, for example, behaviorState=28 is used to indicate that a behavior of opening or closing the door is required here.

Figure 2:
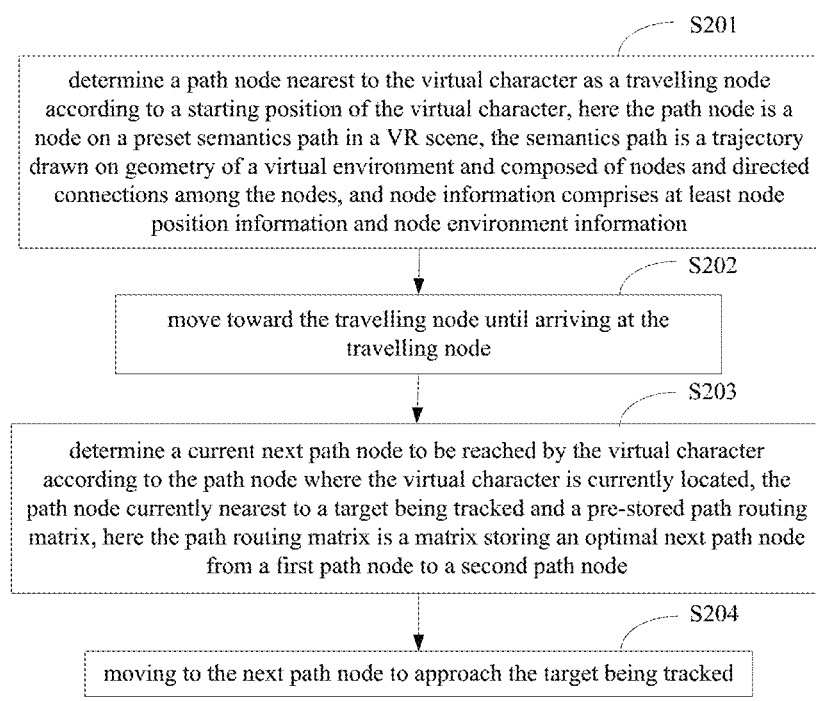
FIG. 2 is a flow diagram of an implementation of a target tracking method provided by the present application

FIG. 2 shows a flow diagram of a target tracking method provided by an embodiment of the present application. An execution subject of this embodiment of the present application is a virtual character, which is specifically an agent provided with a specific appearance and capable of autonomously making behavioral decisions in a virtual environment. That is, the virtual character is a computation entity controlled by a computation unit of a terminal device and displaying its appearance, position, and behaviors on a display unit of the terminal device. The target tracking method as shown in FIG. 2 is detailed as follows:

In a step S201, determine a path node nearest to the virtual character as a travelling node according to a starting position of the virtual character, here the path node is a node on a preset semantics path in a VR scene.

In this embodiment of the present application, the semantics path is a trajectory constructed in advance and composed of path nodes and directed connections among the path nodes, and the semantics path is a preset path for the virtual character to move and pass in the virtual environment. Moreover, in addition to basic node position information, the path nodes further include node environment information, and the virtual character can efficiently and accurately make a motion decision in the virtual environment with help of the preset semantics path so as to advance to a position of a target being tracked. Therefore, after receiving a target tracking task, the virtual character needs to move to a nearest path node of the semantics path in order to make the efficient motion decision with the help of the semantics path.

In this embodiment of the present application, the virtual character can determine its own position information in the VR scene in real time through a position sensing module.

When having acquired the target tracking task through a task acquisition module, the virtual character acquires its own position through the position sensing module, and this position is the starting position of the virtual character. After that, the virtual character acquires information of the semantics path in the virtual environment according to its own pre-stored semantics path information or according to its own vision module, and determines the path node on the semantics path nearest to the starting position as the travelling node that the virtual character needs to arrival at, here the travelling node is a position where the virtual character quickly enters the semantics path.

Figure 3:
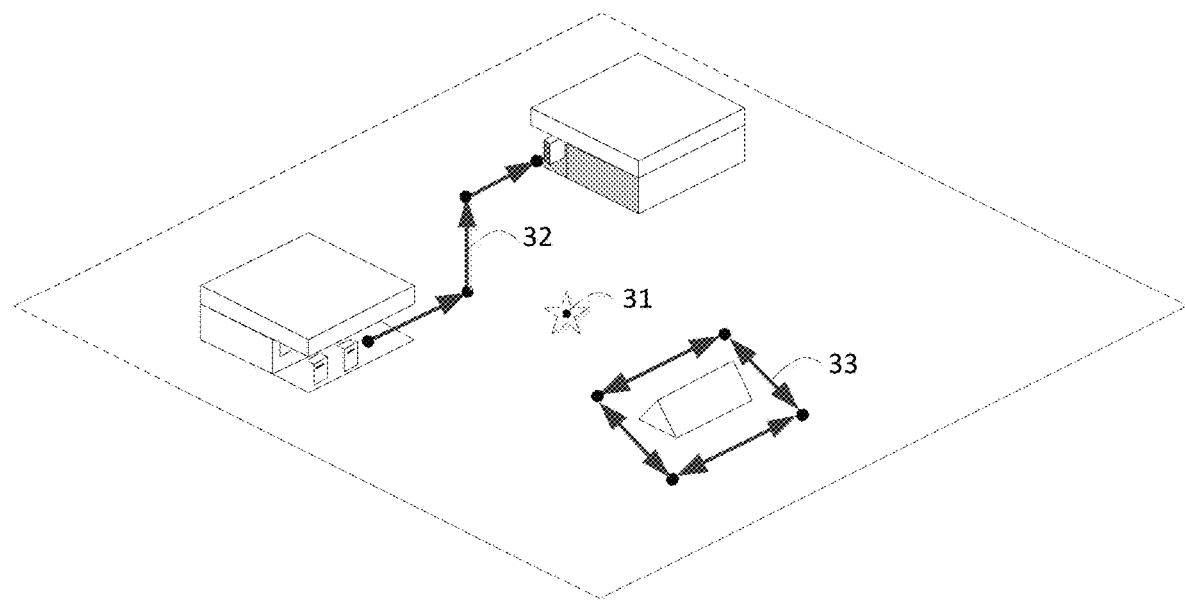
FIG. 3 is a schematic diagram of three semantics paths with different structures provided by the present application.

Specifically, the semantics path in an embodiment of the present application includes a point path, a linear path, and a circular path. FIG. 3 shows a schematic diagram of a VR scene provided by an embodiment of the present application, this VR scene includes the point path 31, the linear path 32, and the circular path 33. Specifically, the point path is a semantics path consisting of only one node, and the point path is a path node that can be freely in and out in the path planning, and this path node is often used as a relay point, for example, as a path transition point when the virtual character steps over other two different semantics paths. Specifically, the linear path is usually used to indicate a path that includes two end points consisting of one inlet end point and one outlet end point and a directed line connecting the two end points; the linear path is often used to indicate a passable path from one destination (for example, the building A) to another destination (for example, the building B), or used to indicate a path to pass through a passable building. The circular path is generally a path composed of a plurality of nodes and directed connections among the nodes and surrounding a certain convex object, and this convex object is generally an impassable obstacle such as a mountain peak and sand pile etc. Specifically, each of the nodes on the circular path is a path node that can be freely in and out, and the virtual character can bypass the obstacle with the convex object through the circular path so as to go to the destination.

In an embodiment of the present application, three different structural paths, namely, the point path, the linear path, and the circular path, are specifically used as the semantics path in the VR scene. Since the three kinds of structural paths may be respectively applied to description for the relay point, the passable path, and the detour path of the obstacle, then these three kinds of structural paths may cover the paths suitable for different virtual environments more comprehensively, so that the semantics path in the VR scene can provide comprehensive and effective reference information on the path planning for the virtual character.

In a step S202, move toward the travelling node until arriving at the travelling node.

After determining the travelling node, the virtual character moves toward the travelling node until arriving at the travelling node, that is, enters the semantics path nearest to the starting position.

In a step S203, determine a next path node that the virtual character is going to arrive at according to the path node where the virtual character is currently located, the path node currently nearest to the target being tracked, and the pre-stored path routing matrix; here the path routing matrix is a matrix storing an optimal next path node from a first path node to a second path node, the first path node and the second path node are arbitrary two of the path nodes, and the optimal next path node is a path node nearest to the first path node in the optimal path from the first path node to the second path node, and the optimal path is a path with the highest travel efficiency.

After arriving at the travelling node, the virtual character may directly and efficiently determine and make the motion decision with the help of the information of the semantics path to approach the target being tracked. Specifically, the motion decision includes determining the current next path node to be reached by the virtual character. In an embodiment of the present application, the current next path node is directly and efficiently determined according to the path routing matrix.

Specifically, the path routing matrix is a matrix storing the optimal next path node between arbitrary two path nodes, and the optimal next path node is a path node nearest to the first path node in the optimal path from the first path node to the second path node. Among them, the first path node and the second path node are arbitrary two path nodes on the semantics path of the VR scene, and the optimal path is the path with the highest travel efficiency, which may be a shortest path and/or a path with fewer behaviors required to performed by the virtual character (the behaviors may include a behavior of opening a door, opening a window, etc.). That is, the path routing matrix in the embodiment of the present application is a matrix obtained by only storing one path node (i.e., the optimal next path node) nearest to the starting point (i.e., the first path node) of the optimal path on the optimal path. Since the immediacy of the virtual character's action decision in the target tracking process is considered (that is, the virtual character only needs to determine the next action), then the path routing matrix only storing one path node can meet the needs of the virtual character's current action decision. Moreover, since each element of the path routing matrix only needs to save one path node (that is, the optimal next path node), therefore the storage space can be saved. In a word, this path routing matrix can meet the immediate and rapid decision-making of the virtual character while saving the storage space.

Specifically, in an embodiment of the present application, each time after the virtual character arrives at one path node, the position information of the virtual character at that time will be updated. For example, after the virtual character arrives at the travelling node, the current position information of the virtual character is updated, and the path node where the virtual character is currently located is determined as the travelling node. At the same time, each time after the virtual character arrives at one path node, the path node that is currently nearest to the target being tracked is acquired. Specifically, since the target being tracked is usually a freely movable agent as same as the virtual character, and its specific position is usually not on the semantics path, therefore, after acquiring the position of the target being tracked, the virtual character needs to determine the path node that is currently nearest to the target being tracked by combining the pre-stored information of the semantics path. Among them, the position information of the target being tracked may be determined by a perception unit of the virtual environment and then transmitted to the execution subject of this embodiment of the present application—the virtual character, or directly determined by a vision module of the virtual character. After determining the path node where the virtual character is currently located and the path node currently nearest to the target being tracked (the path node where the virtual character is currently located is regarded as the first path node, and the path node currently nearest to the target being tracked is regarded as the second path node), the virtual character queries the above-mentioned pre-stored path routing matrix, and directly acquires the corresponding optimal next path node as the next path node to be reached by the current virtual character.

In a step S204, move to the next path node to approach the target being tracked.

After determining the next path node, the virtual character directly moves from the path node where the virtual character is currently located to the next path node according to the information of the semantics path in the VR scene, thereby efficiently approaching the target being tracked.

In an embodiment of the present application, since the semantics path that is capable of recording the position information and the environment information (that is, the node position information and the node environment semantics information are included) is drawn on the virtual environment of the VR scene in advance, and the routing matrix containing the paths in the VR scene is stored, so that the virtual character only needs to go to the travelling node according to its own position to enter the semantics path when tracking the target, and then directly and quickly determines the current next path node according to the path node where the virtual character is currently located, the path node currently nearest to the target being tracked and the pre-stored path routing matrix. That is, the virtual character can immediately make the action decision for the target tracking during the target tracking process based on the pre-constructed semantics path and the path routing matrix, without the real-time path planning and complex action decisions according to the real-time change information of the virtual environment, so that the complexity for the virtual character to track the target can be reduced and the amount of calculations can be reduced, thereby the virtual character's target tracking efficiency can be improved. Moreover, since the optimal next path node stored in the path routing matrix is the path node on the optimal path from arbitrary first path node to arbitrary second path node in the VR environment, and the optimal path is the path with the highest travel efficiency, therefore the next path node and movement determined according to the path routing matrix can make the virtual character approach the target being tracked efficiently, thereby further improving the target tracking efficiency of the virtual character.

Optionally, after the step S204, the method further includes:

S205, updating the path node where the virtual character is currently located and the path node currently nearest to the target being tracked;

S206, if the path node where the virtual character is currently located is the same path node as the path node currently nearest to the target being tracked, moving from the path node where the virtual character is currently located to a current position of the target being tracked to complete the target tracking; otherwise, return to execute the step S203.

In the step S205, after the virtual character moves to the next path node, the current position information of the virtual character is updated, and the path node where the virtual character is currently located is re-determined, and the path node currently closest to the target being tracked is re-determines. Specifically, the path node where the virtual character is currently located is the next path node described in the previous step. Specifically, at this time, the virtual character reacquires the position information of the target being tracked, and re-determines the path node that is currently nearest to the target being tracked according to the position information of the target being tracked and the information of the semantics path.

In the step S206, if it is detected that the path node where the virtual character is currently located is the same path node as the path node nearest to the target being tracked after the update of the step S205, it means that the virtual character has arrived at one path node nearest to the target being tracked, at this time, the virtual character moves from the path node where the virtual character is currently located to the current position of the target being tracked, thereby completing the target tracking task. On the contrary, if the path node where the virtual character is currently located at this time is not the same path node as the path node currently nearest to the target being tracked, it means that the virtual character needs to continue to determine the next path node in order to continue to approach the target being tracked, at this time this method needs to return to execute the step S203, i.e., the next path node is re-determined according to the updated path node where the virtual character is currently located and the updated path node currently nearest to the target being tracked with combination of the routing path matrix, and the target being tracked is continually approached through the path nodes on the semantics path.

In the embodiments of the present application, after arriving at the next path node, the virtual character re-determines the path node where the virtual character is currently located and the path node currently nearest to the target being tracked, and determines the according to the relationship of between these two path nodes, so that the virtual character can eventually arrive at the position of the target being tracked efficiently, that is, catch up with the target being tracked, thereby completing the target tracking task.

Optionally, the step S203 includes:
  determining a current next path node to be reached by the virtual character according to the path node where the virtual character is currently located, the path node currently nearest to the target being tracked, and the pre-stored path routing matrix, if it is detected that the target being tracked is a dynamic target; otherwise, directly executing a static target tracking process to complete the target tracking. The static target tracking process includes:
  A1, determining a tracking path based on the path node where the virtual character is currently located, the path node currently nearest to the target being tracked and the pre-stored optimal path matrix, here the optimal path matrix is a matrix constructed in advance and containing an optimal path between arbitrary two of the path nodes in the VR scene, and the optimal path is the path with the highest travel efficiency;
  A2, moving according to the tracking path until arriving at the path node currently nearest to the target being tracked;
  A3, moving from the path node where the virtual character is currently located to the current position of the target being tracked to complete the target tracking.

In an embodiment of the present application, the target being tracked may be another agent in the VR scene, such as another dynamically moving virtual character, and may also be a static object in the VR scene. When the virtual character detects that the current target being tracked is a dynamic target, such as another dynamically moving virtual character, the above-mentioned step S203 is executed, otherwise the static target tracking process is executed to complete the target tracking. The static target tracking process includes the steps A1-A3, which are described in detail as follows: In the step A1, since the current target being tracked is a non-dynamic target, that is, the current target being tracked is a static target, the position information of the target being tracked will not change, and the path node nearest to the target being tracked is also a fixed path node, therefore the virtual character may directly use the path node where the virtual character is currently located (i.e. the travelling node) as the starting point of the tracking path and use the path node nearest to the target being tracked as an end point of the tracking path after arriving at the travelling node so as to determine the complete tracking path, and the optimal path between the starting point of the tracking path and the end point of the tracking path is quickly queried in the pre-stored optimal path matrix, and the optimal path is used as the current tracking path. In the embodiment of the present application, the optimal path matrix is a matrix containing the optimal path between arbitrary two path nodes in the VR scene. Among them, the arbitrary two path nodes may be path nodes located on the same semantics path, or may be path nodes located on different semantics paths. Through the pre-stored optimal path matrix, the virtual character does not need to acquire in real time the information about the dynamic virtual environment to perform the path planning, nor does it need to calculate in real time the optimal path between the two path nodes, but just needs to simply query the optimal path matrix to quickly determine the tracking path, which greatly reduces the amount of calculation for the virtual character, thereby improving the efficiency of the virtual character's target tracking task.

In the step A2, after the tracking path is determined, the virtual character moves forward on the tracking path based on the information of the path nodes on the tracking path and the directed connections among the path nodes until it arrives at the end point of the tracking path, that is, the path node currently nearest to the target being tracked.

In the step A3, the path node where the virtual character is currently located is the path node nearest to the target being tracked, and the virtual character directly moves to the position of the target being tracked based on the position information of the target being tracked so as to complete target tracking.

In the embodiments of the present application, when the target being tracked is a static target, the complete tracking path can be determined at one time through the static target tracking process according to the pre-stored optimal path, and the virtual character can directly arrive at the path node nearest to the target being tracked according to the tracking path, and then move from this path node to the actual position of the target being tracked, therefore, it is possible to make only one action planning to efficiently arrive at the position of the target being tracked, thereby further improving the target tracking efficiency of the virtual character.

Optionally, the step of moving toward the travelling node in the step S202 includes:
  B1, determining a first travelling path between the starting position and the travelling node according to virtual environment information between the starting position and the travelling node in the VR scene;
  B2, moving toward the travelling node according to the first travelling path until arriving at the travelling node;
  correspondingly, the step S206 or the step of moving from the path node where the virtual character is currently located to the current position of the target being tracked to complete the target tracking in the step A3 includes:
  C1, determining a second travelling path between the path node where the virtual character is currently located and the current position of target being tracked according to the virtual environment information between the path node where the virtual character is currently located and the current position of the target being tracked in the VR scene;

C2, moving to the current position of the target being tracked according to the second travelling path so as to complete the target tracking.

In the embodiments of the present application, when the virtual character goes from the starting position to the travelling node (i.e., the starting point of the tracking path) and goes from the end point of the tracking path to the current actual position of the target being tracked, the virtual character cannot make the action decision according to the information on the semantics path preset in advance, therefore, during these two short paths, the virtual character needs to combine the real-time information of the virtual environment to determine the travelling path so as to connect with the semantics path, and accurately arrive at the actual position of the target being tracked to complete the target tracking. The details are described as follows.

In the step B1, the virtual character may acquire the virtual environment information between the starting position and the travelling node in the VR environment through its own vision module, and make obstacle avoidance decisions based on the virtual environment information, and plan one first travelling path from the starting position to the travelling node. Optionally, the vision module of the virtual character is specifically a cylindrical sight module, and the virtual character establishes cylindrical lines of sight between the starting position and the travelling node through the cylindrical sight module. Specifically, an outline of the virtual character when the virtual character faces toward the target node is taken as a starting cross section, and a plane passing through the travelling node and parallel to the starting cross section is used as an end cross section, so as to construct a geometric cylinder. The line beam of sight perpendicular to the starting cross section and directing to the end cross section on the geometric cylinder is the cylindrical lines of sight. After that, if the cylindrical lines of sight do not collide with the virtual environment, it means that there is no obstacle between the starting position and the travelling node, and a connection line between the starting position and the travelling node is directly determined as the first travelling path; if the cylindrical lines of sight collide with the virtual environment, the position information of the obstacle is determined according to the information of the collision, and one path from the starting position to the travelling node and bypassing the obstacle is determined as the first travelling path according to the position information of the obstacle.

In the step B2, the virtual character moves according to the determined first travelling path until it arrives at the travelling node.

In the step C1, similarly, when arriving at the end of the path nearest to the current position of the target being tracked, the virtual character acquires the virtual environment information between the path node where the virtual character is currently located and the current position of the target being tracked in the VR environment through its own vision module, and makes an obstacle avoidance decision based on the virtual environment information, and plans one path from the path node where the virtual character is currently located to the current position of the target being tracked as the second travelling path.

In the step C2, the virtual character moves according to the determined second travelling path, and finally arrives at the current position of the target being tracked, thereby completing the target tracking task.

In the embodiments of the present application, because before the virtual character arrives at the semantics path and when the virtual character leaves the semantics path to go to the actual position of the target being tracked, the corresponding first travelling path and second travelling path may be accurately determined according to the virtual environment information, so that the virtual character is able to accurately approach the target being tracked even though being outside the semantics path, so as to connect with the tracking path, accurately arrive at the actual position of the target being tracked, and complete the target tracking.

Optionally, the target tracking method further includes:
if the second travelling path between the path node where the virtual character is currently located and the current position of target being tracked is failed to be determined according to the virtual environment information between the path node where the virtual character is currently located and the current position of the target being tracked in the VR scene, determining a position where the virtual character is currently located as an updated starting position, and returning to execute the step of determining the path node nearest to the virtual character as the travelling node according to the starting position of the virtual character.

In an embodiment of the present application, when the virtual character fails to determine the second travelling path according to the virtual environment information between the path node where the virtual character is currently located and the current position of the target being tracked, for example, when there is a huge obstacle between the path node where the virtual character is currently located and the target being tracked, and this results in no passable path between the path node where the virtual character is currently located and the target being tracked, alternatively, when there is suddenly an obstacle during the movement of the virtual character to the current position of the target being tracked according to the second travelling path, and this results in that the virtual character fails to follow the second travelling path to arrive at the current location of the target being tracked, then the virtual character needs to determine other passable paths by use of the semantics path again. Specifically, at this time, the current position of the virtual character is determined as the updated starting position, and the step S201 is returned to be executed to re-determine the first travelling path, the next path node and the second travelling pat, etc. until the position of the target being tracked is finally arrived at.

In this embodiment of the present application, when the virtual character fails to determine the second travelling path or fails to arrive at the position of the target being tracked according to the second travelling path, the path planning can be readjusted in time, thereby ensuring the effective progress of the target tracking.

Optionally, before the step S201, the method further includes:
determining the optimal next path node through determining arbitrary one path node as the first path node and arbitrary one path node as the second path node in turn, until each of the path nodes has been used as the first path node and each of the path nodes has been used as the second path node to obtain the pre-stored path routing matrix;

here the determining the optimal next path node includes:
determining an optimal path from the first path node to the second path node according to the node information of the first path node, the node information of the second path node and the semantics path, here the optimal path is a path with the highest travel efficiency;

determining a path node nearest to the first path node on the optimal path as an optimal next path node, and storing the optimal next path node as an element of the path routing matrix.

In this embodiment of the present application, one path node is acquired from the various path nodes in the VR scene as the first path node and another as the second path node in turn, and the optimal next path node from the first path node to the second path node is determined and stored, until each of the path nodes in the VR scene has been used as the first path node, and each of the path nodes in the VR scene has been used as the second path node to acquire the path routing matrix.

Specifically, assuming that there are a total of n path nodes in the VR scene, then the size of the path routing matrix N is n×n, and diagonal positions of the path routing matrix (suppose that $Node_i$ is arbitrary one path node, then the diagonal position may be represented by $N_{ii}$) represent the optimal next path nodes correspondingly by taking the same path node as the starting point and the end point at the same time, in which the information $Node_i$ of the path nodes themselves is directly filled. The positions other than the diagonal positions of the optimal path matrix are expressed as the optimal next path nodes between arbitrary two different path nodes. The process of determining the optimal next path node between the arbitrary one first path node and the arbitrary one second path node is as follows.

Specifically, assuming that $Node_i$ is the first path node and $Node_j$ is the second path node, then all feasible paths from the $Node_i$ to the $Node_j$ are determined according to the node information of the $Node_i$ and the $Node_j$ and information of the existing directed connection on the semantics path where the path nodes are located to acquire k paths; then, the travel efficiency of the virtual character on each of these k paths is measured, and the path $L_{ij}$ with the highest travel efficiency among the k paths is determined as the optimal path between the $Node_i$ and the $Node_j$. After that, the path node nearest to the first path node in the optimal path is acquired as the optimal next path node and as one element of the path routing matrix, which is stored in the i-th row and j-th column of the path-routing matrix (i.e., the position of $N_s$). By analogy, the corresponding optimal next path nodes are finally stored in the n×n positions of the path routing matrix to acquire the pre-stored path routing matrix. Optionally, if there is no passable path between the path node $Node_i$ and the path node $Node_j$, then empty identification information, such as "null", may be directly filled in the position of $N_{ij}$.

Specifically, the above-mentioned measuring the travel efficiency of the virtual character on each of these k paths and determining the path $L_{ij}$ with the highest travel efficiency among the k paths is determined as the optimal path between the $Node_i$ and the $Node_j$, may include:

respectively calculating any one or more of length, travel time, and a number of behaviors to be completed on the path for each path of the k paths, determining the travel efficiency of each path, and determining one path with the highest travel efficiency as the optimal path. Among them, if the length of the path is shorter, the travel time is shorter, and the number of behaviors that need to be completed is fewer, then the corresponding travel efficiency is higher.

In this embodiment of the present application, since the optimal path between arbitrary two path nodes may be accurately determined according to the semantics path and the node information of the various path nodes in advance, and the optimal next path node is further determined for storage according to the optimal path. In this way, the pre-stored path routing matrix is acquired, so that the path planning may be directly, accurately and efficiently performed according to the pre-stored path routing matrix when the virtual character executes the target tracking task in the future, thereby improving the target tracking efficiency of the virtual character.

Optionally, there are at least two semantics paths, and before determining the optimal next path node, the method further includes:

determining two crossing path points between each two adjacent semantics paths sequentially, and storing the two crossing path points to obtain an adjacent reachability matrix; here the two crossing path points include a first crossing path point on the first semantics path and a second crossing path point on the second semantics path, the first semantics path and the second semantics path are the two adjacent semantics paths, the first crossing path point is one path node determined on the first semantics path nearest to the second semantics path, and the second crossing path point is one path node determined on the second semantics path nearest to the first semantics path;

correspondingly, the step of determining the optimal path from the first path node to the second path node according to the node information of the first path node, the node information of the second path node and the semantics path includes:

determining the optimal path from the first path node to the second path node according to the node information of the first path node, the node information of the second path node, the semantics path and the adjacent reachability matrix.

In this embodiment of the present application, there are at least two semantics paths in the VR scene. When it is required to determine the optimal path between the path node i of the semantics path s and the path node j of the semantics path t, the path from the path node i to the path node j can be only determined completely by combination of the information of the passages connecting the semantics path s and the semantics path t in addition to the node information of the path nodes and the information of the directed connections of the semantics paths.

Specifically, firstly the crossing path points between any two adjacent semantics paths in the VR scene are determined and stored to obtain the adjacent reachability matrix M. Assuming that the first semantics path and the second semantics path are the arbitrary two adjacent semantics paths respectively, then the crossing path points include the first crossing path point on the first semantics path and the second crossing path point on the second semantics path. Specifically, assuming that the first semantics path s and the second semantics path t are the arbitrary two adjacent semantics paths, then the path node Node_s in the first semantics path s nearest to the second semantics path t is determined as the first crossing path point, and the path node Node_t in the second semantics path t nearest to the first semantics path s is determined as the second crossing path point, and then the first crossing path point and the second crossing path point are stored in a position of the s-th row and the t-th column of the adjacent reachability matrix M (i.e., $M_{st}$). By analogy, the adjacent reachability matrix M is finally obtained. Optionally, if there is no passable crossing passage between the first semantics path s and the second semantics path t, empty identification information, such as "null", may be directly filled in the position of $M_{st}$.

After the adjacent reachability matrix is obtained, the optimal path between each two path nodes may be determined and stored according to the node information of the path nodes, the directed connection information of the semantics paths and the information of the adjacent reachability matrix, so as to finally acquire the optimal path matrix. Specifically, let $Node_i$ and $Node_j$ be any two different path nodes respectively, if the $Node_i$ and the $Node_j$ are located on the same semantics path, then the optimal path between the $Node_i$ and $Node_j$ is directly determined according to the node information of the path nodes and the directed connection information of the semantics path; if the $Node_i$ and the $Node_j$ are located on different semantics paths, for example, on the semantics path s and the semantics path t respectively, then an optimal sub-path L_s from the path node $Node_i$ to the above-mentioned path node Node_s is firstly determined on the semantics path s, and then the crossing passage L_st from the path node Node_s to the above-mentioned path node Node_t is determined according to the adjacent reachability matrix M, and next an optimal sub-path L_t from the path node Node_t to the path node $Node_j$ is determined on the semantics path t, and the optimal sub-path L_s, the crossing passage L_st, and the optimal sub-path L_t are finally connected in order to obtain the optimal path between the $Node_i$ and the $Node_j$.

In this embodiment of the present application, the situation where there are multiple semantics paths in the VR scene is taken into consideration. By determining the crossing path points between the adjacent semantics paths, the adjacent reachability matrix is obtained, and then the optimal path of any two path nodes is determined by combination of the adjacent reachability matrix, so that the final optimal path matrix can completely record the optimal path of any two path nodes (including two path nodes located on the same semantics path, as well as two path nodes located on different semantics paths), thereby providing the virtual character with more complete and comprehensive pre-stored information for the subsequent path planning of performing the target tracking task, improving the efficiency of the path planning when the virtual character is tracking the target, and in turn improving the target tracking efficiency of the virtual character.

Optionally, the node information further includes node behavior semantics information, and the node behavior semantics information is configured to identify information about a behavior that needs to be performed on the path node. Correspondingly, the method further includes:

performing a preset action according to the node behavior semantics information and the node environment information when the virtual character moves to the path node.

In this embodiment of the present application, in addition to the node position information and the node environment information, the node information on the semantics path further includes the node behavior semantics information, and the node behavior semantics information is configured to identify the information of the behavior that needs to be performed on the path node. For example, the node behavior semantics information may be stored by using an variable behaviorState, behaviorState=28 is used to identify the behavior of opening or closing a door on this path node, and behaviorState=29 is used to identify the behavior of checking a window on this path node, etc.

When the virtual character moves to the path node, the current preset action is determined and executed according to the node behavior semantics information and the node environment semantics information of this path node. Exemplarily, when the virtual character moves to the path node A, the node behavior semantics information "behaviorState=28" (indicating that the behavior of opening or closing the door is required here) and the node environment information "environmentState=29" (indicating that a door near this node is closed) of the path node A are acquired, and the preset action required to be performed at the node A is determined as opening the door according to the node behavior semantics information and the node environment information, and the action of opening the door is executed.

In this embodiment of the present application, when executing the target tracking task, in addition to determining the corresponding path and approaching the target being tracked, the virtual character further executes the corresponding preset action according to the path nodes passed by during the target tracking, so that the intelligence of the virtual character in performing the target tracking task is further improved, and that the virtual character can smoothly pass through the various path nodes on the tracking path and efficiently approach the target being tracked is ensured, thereby efficiently completing the target tracking task.

Optionally, after the step of moving from the path node where the virtual character is currently located to the current position of the target being tracked in the step S206 or step A3, the method further includes:

executing a target interaction action.

After the virtual character arrives at the position of the target being tracked, the target interaction action is determined and executed according to pre-acquired action instruction information of the target tracking task and/or identity information and behavior information etc. of the target being tracked to perfectly complete the target tracking task. Exemplarily, the target tracking task in an embodiment of the present application is a suspect capture task. The information of the suspect capture task received by the virtual character includes capture action information and pre-stored suspect image information; after arriving at the position of the target being tracked, the virtual character acquires the image information of the target being tracked through the vision module; if the image information of the target being tracked is consistent with the pre-stored suspect image information, then the capture action is performed to complete the current suspect capture task. Exemplarily, the target tracking in an embodiment of the present application is an item delivery task, then the target interaction action is an action of the virtual character delivering an item to the target being tracked.

In this embodiment of the present application, after arriving at the position of the target being tracked, the virtual character further executes the target interaction action according to actual requirements of the application scenario, thereby completing the target tracking tasks of various application scenarios more completely, and improving the intelligence of the target tracking of the virtual character.

It should be understood that, the sequence number of each step in the foregoing embodiments does not mean the order of execution. The execution sequence of each process should be determined by its function and internal logic, and should not constitute any limitation on the implementation process of the embodiments of the present invention.

Figure 4:
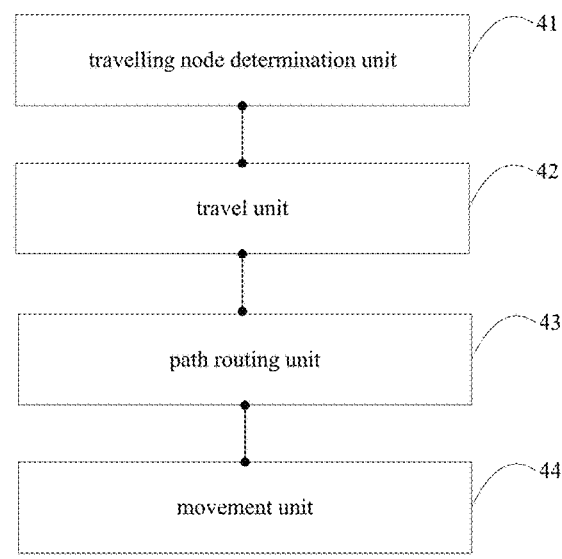
FIG. 4 is a schematic diagram of a composition of a target tracking apparatus provided by the present application.

An embodiment of the present application further provides a target tracking apparatus as shown in FIG. 4. For ease of description, only the parts related to the embodiment of the present application are shown.

The target tracking apparatus may be a virtual character (a computation entity that is controlled by a computation unit of a terminal device and displaying its appearance, position, and behavior on a display unit of the terminal device) or an apparatus composed of part hardware of the virtual character. The target tracking apparatus includes: a travelling node determination unit 41, a travel unit 42, a path routing unit 43, and a movement unit 44.

The travelling node determination unit 41 is configured to determine a path node nearest to the virtual character as a travelling node according to a starting position of the virtual character, here the path node is a node on a preset semantics path in a VR scene, the semantics path is a trajectory drawn on geometry of a virtual environment and composed of nodes and directed connections among the nodes, and the node information includes at least node position information and node environment information.

The travel unit 42 is configured to move toward the travelling node until arriving at the travelling node.

The path routing unit 43 is configured to determine a current next path node to be reached by the virtual character according to the path node where the virtual character is currently located, the path node currently nearest to a target being tracked and a pre-stored path routing matrix; here the path routing matrix is a matrix storing an optimal next path node from a first path node to a second path node, the first path node and the second path node are arbitrary two of the path nodes, the optimal next path node is the path node nearest to the first path node in an optimal path from the first path node to the second path node, and the optimal path is a path with the highest travel efficiency.

The movement unit 44 is configured to move to the next path node to approach the target being tracked.

Optionally, the target tracking apparatus further includes:
an update unit configured to update the path node where the virtual character is currently located and the path node currently nearest to the target being tracked;
a decision unit configured to move from the path node where the virtual character is currently located to a current position of the target being tracked to complete target tracking if the path node where the virtual character is currently located is the same path node as the path node currently nearest to the target being tracked; otherwise, return to execute the step of determining the current next path node to be reached by the virtual character according to the path node where the virtual character is currently located, the path node currently nearest to a target being tracked and the pre-stored path routing matrix.

Optionally, the path routing unit is specifically configured to: determine the current next path node to be reached by the virtual character according to the path node where the virtual character is currently located, the path node currently nearest to the target being tracked and the pre-stored path routing matrix, if it is detected that the target being tracked is a dynamic target; otherwise, directly execute a static target tracking process to complete the target tracking. The static target tracking process includes:
determining a tracking path based on the path node where the virtual character is currently located, the path node currently nearest to the target being tracked and the pre-stored optimal path matrix, here the optimal path matrix is a matrix constructed in advance and containing the optimal path between arbitrary two of the path nodes in the VR scene, and the optimal path is the path with the highest travel efficiency;
moving according to the tracking path until arriving at the path node currently nearest to the target being tracked;
moving from the path node where the virtual character is currently located to the current position of the target being tracked to complete the target tracking.

Optionally, the travel unit is specifically configured to: determine a first travelling path between the starting position and the travelling node according to virtual environment information between the starting position and the travelling node in the VR scene; and move toward the travelling node according to the first travelling path until arriving at the travelling node; and
the travel unit is further configured to: during the movement from the path node where the virtual character is currently located to the current position of target being tracked to complete the target tracking, determine a second travelling path between the path node where the virtual character is currently located and the current position of target being tracked according to the virtual environment information between the path node where the virtual character is currently located and the current position of the target being tracked in the VR scene; and move to the current position of the target being tracked according to the second travelling path so as to complete the target tracking.

Optionally, the target tracking apparatus further includes:
a path routing matrix storage unit configured to determine the optimal next path node through determining arbitrary one path node as the first path node and arbitrary one path node as the second path node in turn, until each of the path nodes has been used as the first path node and each of the path nodes has been used as the second path node to obtain the pre-stored path routing matrix. The determining the optimal next path node includes: determining the optimal path from the first path node to the second path node according to the node information of the first path node, the node information of the second path node and the semantics path, here the optimal path is a path with the highest travel efficiency; determine a path node nearest to the first path node on the optimal path as the optimal next path node, and store the optimal next path node as an element of the path routing matrix.

Optionally, there are at least two semantics paths, and the path routing matrix storage unit configured to determine the optimal next path node through determining arbitrary one path node as the first path node and arbitrary one path node as the second path node in turn, until each of the path nodes has been used as the first path node and each of the path nodes has been used as the second path node to obtain the pre-stored path routing matrix. The determining the optimal next path node includes: determining the optimal path from the first path node to the second path node according to the node information of the first path node, the node information of the second path node and the semantics path, here the optimal path is a path with the highest travel efficiency; determine a path node nearest to the first path node on the optimal path as the optimal next path node, and store the optimal next path node as an element of the path routing matrix.

Optionally, the target tracking apparatus further includes:
an adjacent reachability matrix determination unit configured to determine and store crossing path points between each two adjacent semantics paths sequentially to obtain an adjacent reachability matrix, here the crossing path points includes a first crossing path point on a first semantics path and a second crossing path point on a second semantics path, the first semantics path and the second semantics path are the two adjacent semantics paths, the first crossing path point is one path node determined on the first semantics path nearest to the second semantics path, and the second crossing path point is one path node determined on the second semantics path nearest to the first semantics path;

correspondingly, the step of determining, by the path routing matrix storage unit, the optimal path from the first path node to the second path node according to the node information of the first path node, the node information of the second path node and the semantics path includes:

determining the optimal path from the first path node to the second path node according to the node information of the first path node, the node information of the second path node, the semantics path and the adjacent reachability matrix.

Optionally, the node information further includes node behavior semantics information, and the node behavior semantics information is used to identify information about a behavior that needs to be performed on the path node, and the target tracking apparatus further includes:

a preset action execution unit configured to execute a preset action according to the node behavior semantics information and the node environment information when the virtual character moves to the path node.

The target tracking apparatus further includes:

a target interaction action execution unit configured to execute a target interaction action.

Optionally, the semantics path includes a point path, a linear path, and a circular path.

It should be noted that the information interaction and execution process etc. between the above-mentioned units/modules are based on the same concept as the method embodiments of the present application, and their specific functions and technical effects may specifically refer to the parts of the method embodiments, which will not be repeated here again.

Those skilled in the art can clearly understand that, for the convenience and conciseness of description, the division of the above-mentioned functional units and modules is only used as an example. In practical applications, the above-mentioned functions may be allocated to different functional units and modules for implementation as required, that is, the internal structure of the device is divided into different functional units or modules to realize all or part of the functions described above. The functional units and modules in the embodiments may be integrated into one processing unit, or the various units may exist alone physically, or two or more units may be integrated into one unit. The above-mentioned integrated units may be realized in a form of hardware, and may also be realized in a form of software functional units. In addition, the specific names of the functional units and modules are only for the convenience of distinguishing each other, and are not used to limit the protection scope of the present application. For the specific working process of the units and modules in the foregoing system, reference may be made to the corresponding process in the foregoing method embodiments, which will not be repeated here again.

Figure 5:
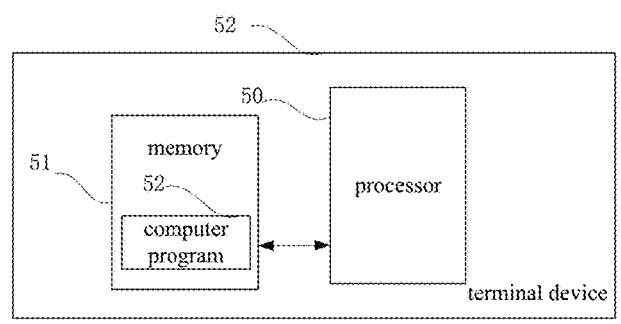
FIG. 5 is a schematic structural diagram of a terminal device provided by the present application.

FIG. 5 is a schematic diagram of a terminal device provided by an embodiment of the present application. As shown in FIG. 5, the terminal device 5 of this embodiment includes: a processor 50, a memory 51, and a computer program 52 stored in the memory 51 and executable on the processor 50, such as an interaction program of VR scenes. The processor 50, when executing the computer program 52, implements the steps in the embodiments of the above VR scene interaction methods, such as the steps from S201 to S204 as shown in FIG. 2. Alternatively, the processor 50, when executing the computer program 52, executes the functions of the modules/units in the foregoing apparatus embodiments, such as the functions of the modules from 41 to 44 as shown in FIG. 4.

Exemplarily, the computer program 52 may be divided into one or more modules/units, and the one or more modules/units are stored in the memory 51 and executed by the processor 50 to complete the present application. The one or more modules/units may be a series of computer program instruction segments capable of completing specific functions, and the instruction segments are configured to describe the execution process of the computer program 52 in the terminal device 5. For example, the computer program 52 may be divided into a travelling node determination unit, a travel unit, a path routing unit, and a movement unit.

The terminal device 5 may be a computing device such as a desktop computer, a notebook, a palmtop computer, and a cloud server etc. The terminal device may include, but is not limited to, the processor 50 and the memory 51. Those skilled in the art should understand that FIG. 5 is only an example of the terminal device 5, and does not constitute a limitation on the terminal device 5. The terminal device may include more or less components than those shown in the figure, or include a combination of certain components, or different components. For example, the terminal device may further include an input and output device, a network access device, a bus, and so on.

The so-called processor 50 may be a CPU (Central Processing Unit), and may be other general-purpose processor, DSP (Digital Signal Processor), ASIC (Application Specific Integrated Circuit), FPGA (Field-Programmable Gate Array), or other programmable logic device, discrete gate or transistor logic device, discrete hardware component, etc. The general-purpose processor may be a microprocessor or the processor may also be any conventional processor or the like.

The memory 51 may be an internal storage unit of the terminal device 5, such as a hard disk or a memory of the terminal device 5. The memory 51 may also be an external storage device of the terminal device 5, such as a plug-in hard disk, a SMC (Smart Media Card), and a SD (Secure Digital) card or a flash card etc. equipped on the terminal device 5. Further, the memory 51 may further include both an internal storage unit and an external storage device of the terminal device 5. The memory 51 is used to store the computer program and other programs and data required by the terminal device. The memory 51 may further be used to temporarily store data that has been output or will be output.

It will be clearly understood by those skilled in the art that, for convenience and brevity of description, the division of the various functional units or modules described above is only taken as an example for illustration. In practical applications, the above functions may be assigned to different functional units or modules for completion according to needs. That is, the internal structure of the apparatus is divided into different functional units or modules to realize all or part of the functions described above. The various functional units or modules in the embodiments may be integrated into one processing unit, or each of the units may exist physically separately, or two or more units may be integrated into one unit. The above integrated unit may be implemented in a form of hardware, or may be implemented in a form of software functional unit. In addition, the specific names of the respective functional units or modules are only for the purpose of facilitating mutual differentiation, and are not intended to limit the protection scope of the present application. The specific working process of the units or modules in the foregoing system may refer to the corresponding process in the foregoing method embodiments, and details of which will be not described herein again.

In the above embodiments, each of the embodiments is described with particular emphasis, and parts that are not detailed or described in a certain embodiment may refer to related description of other embodiments.

Those of ordinary skill in the art will appreciate that, the exemplary units and algorithm steps described in combination with the embodiments disclosed herein may be implemented by electronic hardware, or a combination of computer software and electronic hardware. Whether these functions are executed in the form of hardware or software depends on a specific application and a design constraint of the technical solution. A person skilled in the art may use different methods to implement the described functions for each particular application, and such implementation should not be considered to be beyond the scope of the present application.

In the embodiments provided by the present application, it should be understood that the disclosed apparatus/terminal device and method may be implemented in other manners. For example, the apparatus/terminal device embodiments described above are merely illustrative. For example, the division of the modules or units is only a division for logical functions, and there may be other division manners in actual implementation, for example, a plurality of units or components may be combined or integrated into another system, or some features may be omitted or not executed. In addition, the mutual coupling or direct coupling or communication connection as shown or discussed may be indirect coupling or communication connection through some interfaces, devices or units, which may be in an electrical or mechanical form or other forms.

The units described as separate components may or may not be physically separate. The components shown as units may or may not be physical units, that is, may be located at one place, or may be distributed on a plurality of network units. Some or all of the units may be selected according to actual needs to achieve the purpose of the solutions of the embodiments.

In addition, the various functional units in each embodiment of the present application may be integrated into one processing unit, or each of the units may exist physically separately, or two or more units may be integrated into one unit. The above integrated units may be implemented in a form of hardware or in a form of a software functional unit.

The integrated module/unit, if implemented in the form of the software functional unit and sold or used as a stand-alone product, may be stored in a computer-readable storage medium. Based on such understanding, the present application may implement all or part of the processes in the above embodiments through instructing related hardware by a computer program, and the computer program may be stored in the computer-readable storage medium. The computer program, when executed by the processor, may implement the steps of the various method embodiments described above. Here, the computer program includes a computer program code, and the computer program code may be in a form of a source code, an object code, an executable file, or some intermediate forms. The computer-readable medium may include: any entity or apparatus capable of carrying the computer program code, a recording medium, a USB flash disk, a removable hard disk, a magnetic disk, an optical disk, a computer memory, a ROM (Read-Only Memory), a RAM (Random Access Memory), an electrical carrier signal, a telecommunication signal, or software distribution media or the like. It should be noted that, the content contained in the computer-readable medium may be appropriately increased or decreased according to requirements of legislation and patent practice in a jurisdiction. For example, in some jurisdictions, according to the legislation and the patent practice, the computer-readable medium does not include the electrical carrier signal and the telecommunication signal.

The above embodiments are only used to illustrate the technical solutions of the present application, but are not intended to limit the present application. Although the present application has been described in detail with reference to the foregoing embodiments, those of ordinary skill in the art should understand that the technical solutions disclosed in the above embodiments may be modified, or some of the technical features therein may be equivalently substituted. These modifications or substitutions do not depart corresponding technical solutions from the spirit and scope of the technical solutions of the embodiments of the present application, and should be included in the protection scope of the present application.

What is claimed is:

1. A target tracking method, applied to a virtual character, and comprising steps of:
   determining a path node nearest to the virtual character as a travelling node according to a starting position of the virtual character, wherein the path node is a node on a preset semantics path in a VR scene, the semantics path is a trajectory drawn on geometry of a virtual environment and composed of nodes and directed connections among the nodes, and node information comprises at least node position information and node environment information;
   moving toward the travelling node until arriving at the travelling node;
   determining a current next path node to be reached by the virtual character according to the path node where the virtual character is currently located, the path node currently nearest to a target being tracked and a pre-stored path routing matrix, wherein the pre-stored path routing matrix is a matrix storing an optimal next path node from a first path node to a second path node, the first path node and the second path node are arbitrary two of the path nodes, the optimal next path node is the path node nearest to the first path node in an optimal path from the first path node to the second path node, and the optimal path is a path with the highest travel efficiency;
   moving to the next path node to approach the target being tracked.

2. The target tracking method according to claim 1, wherein, after the step of moving to the next path node to approach the target being tracked, the method further comprises:
   updating the path node where the virtual character is currently located and the path node currently nearest to the target being tracked;
   moving from the path node where the virtual character is currently located to a current position of the target being tracked to complete target tracking if the path node where the virtual character is currently located is the same path node as the path node currently nearest to the target being tracked; otherwise, returning to execute the step of determining the current next path node to be reached by the virtual character according to the path node where the virtual character is currently located, the path node currently nearest to a target being tracked and the pre-stored path routing matrix.

3. The target tracking method according to claim 2, wherein, the step of determining the current next path node to be reached by the virtual character according to the path node where the virtual character is currently located, the path node currently nearest to the target being tracked and the pre-stored path routing matrix comprises:

determining the current next path node to be reached by the virtual character according to the path node where the virtual character is currently located, the path node currently nearest to the target being tracked and the pre-stored path routing matrix, if it is detected that the target being tracked is a dynamic target; otherwise, directly executing a static target tracking process to complete the target tracking; wherein the static target tracking process comprises steps of:

determining a tracking path based on the path node where the virtual character is currently located, the path node currently nearest to the target being tracked and the pre-stored optimal path matrix, wherein the optimal path matrix is a matrix constructed in advance and containing the optimal path between arbitrary two of the path nodes in the VR scene, and the optimal path is the path with the highest travel efficiency;

moving according to the tracking path until arriving at the path node currently nearest to the target being tracked;

moving from the path node where the virtual character is currently located to the current position of the target being tracked to complete the target tracking.

4. The target tracking method according to claim 3, wherein, the step of moving toward the travelling node comprises:

determining a first travelling path between the starting position and the travelling node according to virtual environment information between the starting position and the travelling node in the VR scene;

moving toward the travelling node according to the first travelling path until arriving at the travelling node;

determining a second travelling path between the path node where the virtual character is currently located and the current position of target being tracked according to the virtual environment information between the path node where the virtual character is currently located and the current position of the target being tracked in the VR scene;

moving to the current position of the target being tracked according to the second travelling path so as to complete the target tracking.

5. The target tracking method according to claim 2, wherein, after the step of moving from the path node where the virtual character is currently located to the current position of the target being tracked, the method further comprises:

executing a target interaction action.

6. The target tracking method according to claim 1, wherein, before the step of determining the current next path node to be reached by the virtual character according to the path node where the virtual character is currently located, the path node currently nearest to a target being tracked and the pre-stored path routing matrix, the method further comprises:

determining the optimal next path node through determining arbitrary one path node as the first path node and arbitrary one path node as the second path node in turn, until each of the path nodes has been determined as the first path node and each of the path nodes has been determined as the second path node to determine the pre-stored path routing matrix;

wherein the step of determining the optimal next path node comprises:

determining the optimal path from the first path node to the second path node according to the node information of the first path node, the node information of the second path node and the semantics path, wherein the optimal path is the path with the highest travel efficiency;

determining the path node nearest to the first path node on the optimal path as the optimal next path node, and storing the optimal next path node as an element of the path routing matrix.

7. The target tracking method according to claim 6, wherein, at least two semantics paths are provided, and before the step of determining the optimal next path node, the method further comprises:

determining and storing crossing path points between each two adjacent semantics paths sequentially to obtain an adjacent reachability matrix, wherein the crossing path points comprises a first crossing path point on a first semantics path and a second crossing path point on a second semantics path, the first semantics path and the second semantics path are the two adjacent semantics paths, the first crossing path point is one path node determined on the first semantics path nearest to the second semantics path, and the second crossing path point is one path node determined on the second semantics path nearest to the first semantics path;

correspondingly, the step of determining the optimal path from the first path node to the second path node according to the node information of the first path node, the node information of the second path node and the semantics path comprises:

determining the optimal path from the first path node to the second path node according to the node information of the first path node, the node information of the second path node, the semantics path and the adjacent reachability matrix.

8. The target tracking method according to claim 1, wherein, the node information further comprises node behavior semantics information, and the node behavior semantics information is used to identify information about a behavior that needs to be performed on the path node, and the method further comprises:

executing a preset action according to the node behavior semantics information and the node environment information when the virtual character moves to the path node.

9. The target tracking method according to claim 1, wherein, the semantics path comprises a point path, a linear path, and a circular path.

10. A target tracking apparatus, comprising:

a travelling node determination unit configured to determine a path node nearest to a virtual character as a travelling node according to a starting position of the virtual character, wherein the path node is a node on a preset semantics path in a VR scene, the semantics path is a trajectory drawn on geometry of a virtual environment and composed of nodes and directed connections among the nodes, and the node information comprises at least node position information and node environment information;

a travel unit configured to move toward the travelling node until the travelling node is arrived at;

a path routing unit configured to determine a current next path node to be reached by the virtual character according to the path node where the virtual character is currently located, the path node currently nearest to a target being tracked and a pre-stored path routing matrix, wherein the pre-stored path routing matrix is a matrix storing an optimal next path node from a first path node to a second path node, the first path node and the second path node are arbitrary two of the path nodes, the optimal next path node is the path node nearest to the first path node in an optimal path from the first path node to the second path node, and the optimal path is a path with the highest travel efficiency;

a movement unit configured to move to the next path node to approach the target being tracked.

11. The target tracking apparatus according to claim 10, further comprising:

an update unit configured to update the path node where the virtual character is currently located and the path node currently nearest to the target being tracked;

a decision unit configured to: move from the path node where the virtual character is currently located to a current position of the target being tracked to complete target tracking if the path node where the virtual character is currently located is the same path node as the path node currently nearest to the target being tracked; otherwise, return to execute, by the path routing unit, determining the current next path node to be reached by the virtual character according to the path node where the virtual character is currently located, the path node currently nearest to a target being tracked and the pre-stored path routing matrix.

12. The target tracking apparatus according to claim 11, wherein, the path routing unit is specifically configured to: determine the current next path node to be reached by the virtual character according to the path node where the virtual character is currently located, the path node currently nearest to the target being tracked and the pre-stored path routing matrix, if it is detected that the target being tracked is a dynamic target; otherwise, directly execute a static target tracking process to complete the target tracking; wherein the static target tracking process comprises:

determining a tracking path based on the path node where the virtual character is currently located, the path node currently nearest to the target being tracked and the pre-stored optimal path matrix, wherein the optimal path matrix is a matrix constructed in advance and containing the optimal path between arbitrary two of the path nodes in the VR scene, and the optimal path is the path with the highest travel efficiency;

moving according to the tracking path until arriving at the path node currently nearest to the target being tracked;

moving from the path node where the virtual character is currently located to the current position of the target being tracked to complete the target tracking.

13. The target tracking apparatus according to claim 12, wherein, the travel unit is specifically configured to: determine a first travelling path between the starting position and the travelling node according to virtual environment information between the starting position and the travelling node in the VR scene, and move toward the travelling node according to the first travelling path until the travelling node is arrived at; and the travel unit is further configured to: during the movement from the path node where the virtual character is currently located to the current position of target being tracked to complete the target tracking, determine a second travelling path between the path node where the virtual character is currently located and the current position of target being tracked according to the virtual environment information between the path node where the virtual character is currently located and the current position of the target being tracked in the VR scene, and move to the current position of the target being tracked according to the second travelling path so as to complete the target tracking.

14. The target tracking apparatus according to claim 11, wherein, the apparatus further comprises:

a target interaction action execution unit configured to execute a target interaction action.

15. The target tracking apparatus according to claim 10, further comprising:

a path routing matrix storage unit configured to: determine the optimal next path node through determining arbitrary one path node as the first path node and arbitrary one path node as the second path node in turn, until each of the path nodes has been used as the first path node and each of the path nodes has been used as the second path node to determine the pre-stored path routing matrix;

wherein the determining the optimal next path node comprises:

determining the optimal path from the first path node to the second path node according to the node information of the first path node, the node information of the second path node and the semantics path, wherein the optimal path is the path with the highest travel efficiency; determining the path node nearest to the first path node on the optimal path as the optimal next path node, and storing the optimal next path node as an element of the path routing matrix.

16. The target tracking apparatus according to claim 15, wherein, at least two semantics paths are provided, and the apparatus further comprises:

an adjacent reachability matrix determination unit configured to determine and store crossing path points between each two adjacent semantics paths sequentially to obtain an adjacent reachability matrix, wherein the crossing path points comprises a first crossing path point on a first semantics path and a second crossing path point on a second semantics path, the first semantics path and the second semantics path are the two adjacent semantics paths, the first crossing path point is one path node determined on the first semantics path nearest to the second semantics path, and the second crossing path point is one path node determined on the second semantics path nearest to the first semantics path;

correspondingly, the step of determining, by the path routing matrix storage unit, the optimal path from the first path node to the second path node according to the node information of the first path node, the node information of the second path node and the semantics path comprises:

determining the optimal path from the first path node to the second path node according to the node information of the first path node, the node information of the second path node, the semantics path and the adjacent reachability matrix.

17. The target tracking apparatus according to claim 10, wherein, the node information further comprises node behavior semantics information, and the node behavior semantics information is used to identify information about a behavior that needs to be performed on the path node, and the apparatus further comprises:

a preset action execution unit configured to execute a preset action according to the node behavior semantics information and the node environment information when the virtual character moves to the path node.

18. The target tracking apparatus according to claim 10, wherein, the semantics path comprises a point path, a linear path, and a circular path.

19. A terminal device, comprising a memory, a processor, and a computer program stored in the memory and executable on the processor, wherein the processor, when executing the computer program, causes the terminal device to implement steps of:

determining a path node nearest to a virtual character as a travelling node according to a starting position of the virtual character, wherein the path node is a node on a preset semantics path in a VR scene, the semantics path is a trajectory drawn on geometry of a virtual environment and composed of nodes and directed connections among the nodes, and node information comprises at least node position information and node environment information;

moving toward the travelling node until arriving at the travelling node;

determining a current next path node to be reached by the virtual character according to the path node where the virtual character is currently located, the path node currently nearest to a target being tracked and a pre-stored path routing matrix, wherein the pre-stored path routing matrix is a matrix storing an optimal next path node from a first path node to a second path node, the first path node and the second path node are arbitrary two of the path nodes, the optimal next path node is the path node nearest to the first path node in an optimal path from the first path node to the second path node, and the optimal path is a path with the highest travel efficiency;

moving to the next path node to approach the target being tracked.

20. The terminal device according to claim 19, wherein, after the step of moving to the next path node to approach the target being tracked, the processor, when executing the computer program, causes the terminal device to further implement steps of:

updating the path node where the virtual character is currently located and the path node currently nearest to the target being tracked;

moving from the path node where the virtual character is currently located to a current position of the target being tracked to complete target tracking if the path node where the virtual character is currently located is the same path node as the path node currently nearest to the target being tracked; otherwise, returning to execute the step of determining the current next path node to be reached by the virtual character according to the path node where the virtual character is currently located, the path node currently nearest to a target being tracked and the pre-stored path routing matrix.

\* \* \* \* \*